(12) United States Patent
Batey et al.

(10) Patent No.: US 8,769,482 B2
(45) Date of Patent: Jul. 1, 2014

(54) METHOD AND SYSTEM FOR BUILDING AN APPLICATION

(75) Inventors: Christopher Michael Batey, Winchester (GB); Katie Shepherd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 12/639,983

(22) Filed: Dec. 16, 2009

(65) Prior Publication Data
US 2010/0153909 A1    Jun. 17, 2010

(30) Foreign Application Priority Data
Dec. 16, 2008    (GB) .................................... 08171768

(51) Int. Cl.
*G06F 9/44* (2006.01)

(52) U.S. Cl.
USPC ........... 717/104; 717/107; 717/110; 717/111; 717/140

(58) Field of Classification Search
None
See application file for complete search history.

(56) References Cited

U.S. PATENT DOCUMENTS

| 5,689,708 | A | * | 11/1997 | Regnier et al. | 709/229 |
|---|---|---|---|---|---|
| 5,822,580 | A | * | 10/1998 | Leung | 717/164 |
| 5,960,200 | A | * | 9/1999 | Eager et al. | 717/147 |
| 6,272,675 | B1 | * | 8/2001 | Schrab et al. | 717/100 |
| 6,938,240 | B2 | * | 8/2005 | Charisius et al. | 717/104 |
| 6,985,955 | B2 | | 1/2006 | Gullotta et al. | |
| 2003/0046657 | A1 | * | 3/2003 | White | 717/105 |
| 2003/0200532 | A1 | | 10/2003 | Gensel | |
| 2005/0065970 | A1 | | 3/2005 | King et al. | |
| 2005/0144226 | A1 | * | 6/2005 | Purewal | 709/203 |
| 2005/0273763 | A1 | * | 12/2005 | Bendsen et al. | 717/120 |
| 2006/0037001 | A1 | | 2/2006 | Irie et al. | |
| 2006/0230396 | A1 | | 10/2006 | Martinez et al. | |
| 2007/0033571 | A1 | * | 2/2007 | Moore et al. | 717/104 |
| 2007/0074156 | A1 | | 3/2007 | Nelson et al. | |
| 2008/0134135 | A1 | * | 6/2008 | Elaasar | 717/104 |
| 2008/0148245 | A1 | * | 6/2008 | Gutz | 717/141 |
| 2008/0222617 | A1 | * | 9/2008 | Fernando et al. | 717/139 |
| 2008/0270944 | A1 | * | 10/2008 | Balfe et al. | 715/848 |
| 2009/0083297 | A1 | * | 3/2009 | Pohl et al. | 707/101 |
| 2009/0112981 | A1 | * | 4/2009 | Markovich | 709/203 |
| 2009/0125896 | A1 | | 5/2009 | Chessell et al. | |
| 2009/0217302 | A1 | * | 8/2009 | Grechanik et al. | 719/320 |
| 2010/0131857 | A1 | * | 5/2010 | Prigge | 715/744 |

* cited by examiner

*Primary Examiner* — Chameli Das
(74) *Attorney, Agent, or Firm* — Jordan IP Law, LLC (57) ABSTRACT

A method and system for building an application are provided. The method includes generating a user model relating to a new application to be built. The user model may include at least one role with one or more associated tasks. A task list is compiled for the tasks in the user model, including removing any duplications of tasks. A task to application component mapping is accessed. The application components to which the tasks are mapped may be spread over one or more existing applications. The application components mapped to by the tasks are retrieved and compiled in the new application.

18 Claims, 12 Drawing Sheets

METHOD AND SYSTEM FOR BUILDING AN APPLICATION

This application claims priority to United Kingdom Patent Application No. 08171768.8, filed on Dec. 16, 2008.

FIELD OF THE INVENTION

This invention relates to the field of computer software development. In particular, the invention relates to building an application based on a user role.

BACKGROUND

A problem arises in that users often have to use more than one software application to perform a particular user's role. So the user needs to flip between multiple applications to carry out all the required tasks of the role.

The software applications which are used may be Rich Client Platforms (RCPs) covering different tasks of a role. The RCPs are commonly built with the same software development kit (SDK), such as Java platform and Swing SDK (Java and Swing are trade marks of Sun Microsystems, Inc.), or Java platform and the Eclipse SDK (Eclipse is a trade mark of Eclipse, Inc.).

For example, to develop a Web services scenario that includes multiple Web service providers (.NET server, WebSphere Application Server, WebSphere Message Broker), a user typically needs to use more than one RCP. This is because each of these Web service providers provides their own RCP, even when they are from the same company.

Additionally, the majority of the functionality of the RCPs are not used by users; a single user may use 20% of three products, yet have to have 100% of all three products installed at all times.

SUMMARY

According to a first aspect of the present invention there is provided a method for building an application comprising: generating a user model relating to a new application to be built, the user model including at least one role with one or more associated tasks; compiling a task list for the tasks in the user model, including removing any duplications of tasks; accessing a task to application component mapping, wherein application components to which the tasks are mapped are spread over one or more existing applications; retrieving the application components mapped to by the tasks; and compiling the retrieved components in the new application.

According to one embodiment, the application components of the one or more existing applications are preferably specific to a software development kit.

Generating the user model may generate a cross-product user model including tasks from one or more user models of existing applications.

In one embodiment, the one or more existing applications are rich client platforms for the software development kit and the application components are plugins.

The application components may have dependencies and the method may include dynamically determining the dependencies during building of the application.

The at least one role of the user model may include a goal or a set of goals and the new application may be built to achieve the goal or set of goals. The user model may include a cross-product goal with two or more product specific sub-goals each with one or more associated tasks.

The user model may be a unified modelling language (UML) model.

The method may also include dynamically changing the role in the user model and updating the generated application for the user model by updating the mapped application components.

According to a second aspect of the present invention there is provided a computer program product stored on a computer readable storage medium for building an application, comprising computer readable program code means for performing the steps of: generating a user model relating to a new application to be built, the user model including at least one role with one or more associated tasks; compiling a task list for the tasks in the user model, including removing any duplications of tasks; accessing a task to application component mapping, wherein application components to which the tasks are mapped are spread over one or more existing applications; retrieving the application components mapped to by the tasks; and compiling the retrieved components in the new application.

According to a third aspect of the present invention there is provided a method of providing a service to a customer over a network, the service comprising: generating a user model relating to a new application to be built, the user model including at least one role with one or more associated tasks; compiling a task list for the tasks in the user model, including removing any duplications of tasks; accessing a task to application component mapping, wherein application components to which the tasks are mapped are spread over one or more existing applications; retrieving the application components mapped to by the tasks; and compiling the retrieved components in the new application.

According to a fourth aspect of the present invention there is provided a system for building an application comprising: a processor; a user model generator for generating a user model relating to a new application to be built, the user model including at least one role with one or more associated tasks; a task list compiler for compiling the tasks in the user model, including removing any duplications of tasks; a task to application component mapping, wherein application components to which the tasks are mapped are spread over one or more existing applications; an application shell to which the application components mapped to by the tasks are added.

The application components of the one or more existing applications may be specific to a software development kit.

A user model generator may generate a cross-product user model including tasks from one or more user models of existing applications.

The application components may have dependencies and the system may include a mechanism for dynamically determining the dependencies during building of the application.

The system may also include a mechanism for dynamically changing the role in the user model and updating the generated application for the user model by updating the mapped application components.

The invention combines components from existing applications into a single application that is focused to a user's role, so that multiple applications do not need to be used. The invention applies user modelling in integrating and customising multiple applications.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The described system and method use components of one or more existing applications to provider a user with a single application catered to achieving a particular goal or set of goals. This is to be achieved by utilizing user modelling techniques. The existing applications may be any applications that are composed of separable components which can be pulled out and put into a new application.

If there are two or more existing applications, the existing applications have a common core component so that the components from different applications are compatible with each other. In a case where a single existing application is cut down and its components used, it must be made of only separable components.

The components of the existing applications are self-contained and separable components, for example, plugins, bundles, etc. For example, the OSGi (Open Services Gateway initiative) framework provides modularization of applications into smaller bundles. Any application that follows OSGi framework would be an example of an application that can be built using a task to component mapping. An OSGi bundle is a tightly-coupled, dynamically loadable collection of classes, jars, and configurable files that explicitly declare their external dependencies.

In one embodiment, the existing applications are RCPs (also referred to as RCP applications) built with the same software development kit to provide the user with a single RCP catered to achieving a particular goal or set of goals. The following description uses the example of RCPs for the applications being built.

A software development kit (SDK) is a set of development tools that allows a software engineer to create software applications. For example, an application may be built with an SDK such as Java platform and Swing SDK, or Java platform and the Eclipse SDK. Applications that are developed with an SDK often use a set of core components from the SDK or sit on a common framework provided by the SDK, and these are distributed to users as a complete rich client platform (RCP).

RCPs are pieces of software usually including the components: a core, a standard bundling framework, a portable widget toolkit, file buffers, text handling, text editors, a workbench, and an update manager. Programmers can build their own RCPs using the provided framework instead of having to write an application from scratch. RCPs are written as plugins and may themselves have further plugins. Plugin frameworks add specific capability to applications. The core components, framework, and the plugin architecture of any RCP are SDK-specific.

For example, to develop a Web services scenario it is common to have to use multiple Web services providers. Each of these providers have their own RCPs, such as a server toolkit to develop an application server Web service and a message broker toolkit to develop a message broker Web service. These toolkits are often RCPs that have been built using the same SDK.

The described method and system use a user model such as a unified modelling language (UML) model, which describes a user and their use of software in order to achieve their goals. The user model is used to select the required components (for example, RCP plugins) when creating an application that is focused to the user's role. A user model illustrates the idea that users have roles, with goals that they wish to achieve, and tasks that must be performed in order to achieve their goals. Additionally, a role may have certain skill sets, which relate to the tasks in such a way that the user must own this set of skills in order to carry out the tasks.

A user model is generated manually for an existing application or product as a task orientated way of defining the goal of the existing application.

Knowing the set of goals means that the tasks required in order to achieve these goals are also known. Goals can also have sub-goals, so a cross-application goal may have two application-specific goals. Using the same Web services example, a cross-product goal will be to develop a Web services scenario, which would have two application-specific sub-goals of developing an application server Web service and developing a message broker Web service.

Mapping the tasks in the user model to software components will allow a system to pull out the correct components from multiple existing applications and build a single application, catered towards a set of goals. This will result in a tailored application made up of just the required components from each of the original applications.

This is achieved by mapping tasks in a user model to software components within the existing application that the model relates to. The types of software components will be compatible, for example, SDK specific. The model can then be used to pull out the correct software components and build an application based on the goals and tasks of the user. This process can be applied across applications when goals and tasks span more than a single application.

Figure 1A:
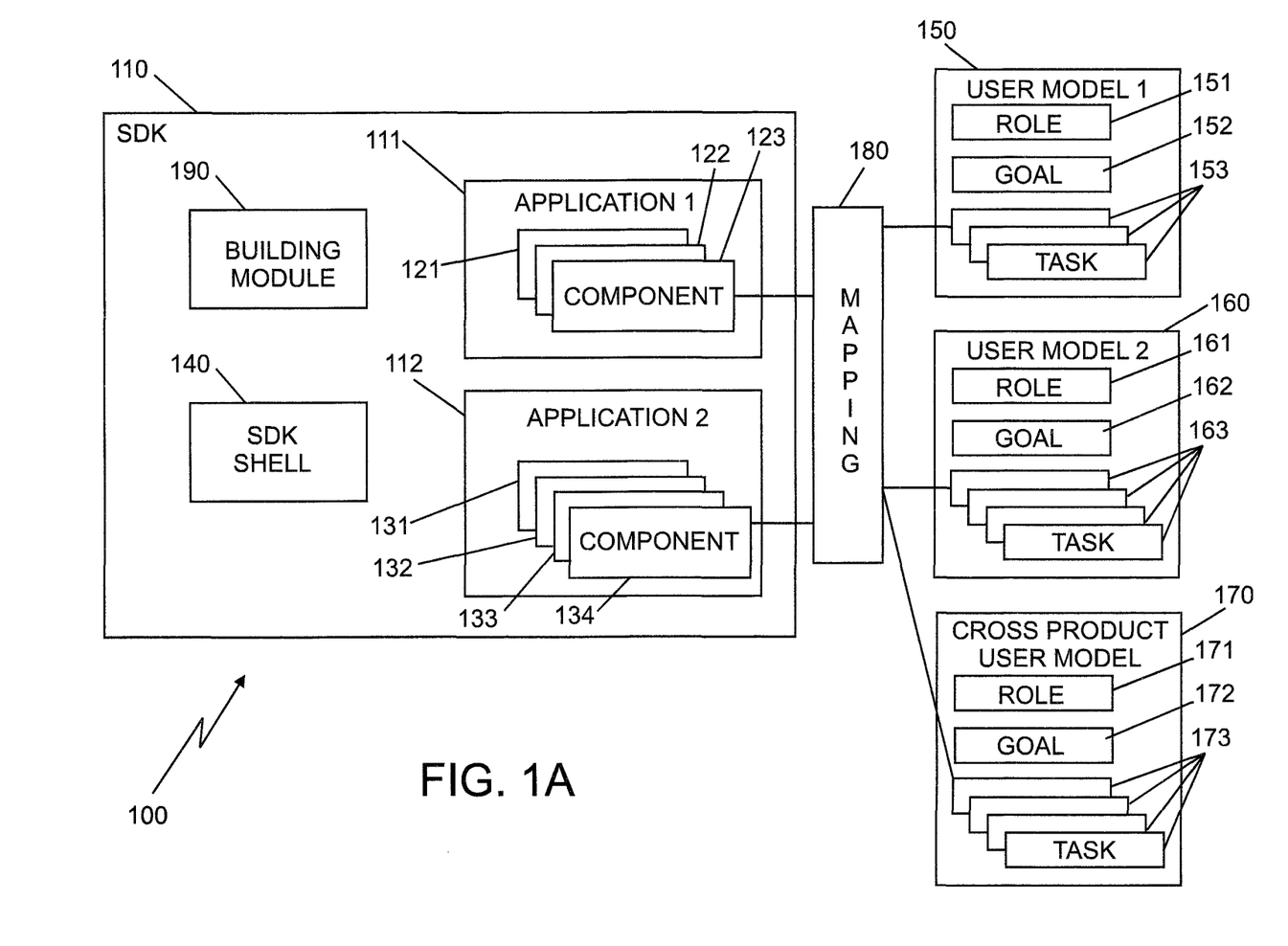
FIGS. 1A and 1B are block diagrams of system in accordance with one embodiment of the present invention.

Referring to FIG. 1A, a block diagram shows a system 100 with a SDK 110 including multiple existing applications or products (for example, in the form of RCPs) 111, 112 each including SDK specific components 121-123, 131-134 such as plugins. An SDK shell 140 is provided for a new application being built. The SDK shell 140 provides a template for adding software components of the new application. The SDK shell 140 is the base layer that is included with all applications built using that particular SDK. For the case of building RCPs it is the framework that allows plugins to be installed, and the base graphical user interface shell. In some situations, an SDK shell 140 may not be required and a new application may be built directly by combining components.

The system 100 includes user models 150, 160 for each existing application 111, 112, which have been manually generated by a developer to define the goals of applications 111, 112. Each user model 150, 160 including defined roles 151, 161, with roles 151, 161 having goals 152, 162, and goals 152, 162 having tasks 153, 163. The system 100 also includes a mapping component 180 mapping tasks 153, 163 of the user models 150, 160 to the SDK specific components 121-123, 131-134 of an exiting application 111, 112 available in the SDK 110.

The system 100 includes a building module 190 for generation of the new application in the SDK shell 140. The building module 190 uses a cross-product user model 170 generated for a specific role or multiple specific roles. The term cross-product user model means that the user model may include tasks from more than one existing application or product; however, the cross-product user model may only include a sub-set of tasks from a single application or product to fulfil a role. The cross-product user model 170 is generated manually by a software developer or user to define the goals and tasks he/she wishes to accommodate in a new application.

The cross-product user model 170 includes the specific role 171 with its corresponding goal 172 and associated tasks 171-173. The mapping component 180 for the user models 150, 160 is used to map the tasks 171-173 to the SDK specific components 121-123, 11-134 across multiple existing applications 111, 112.

The mapping component 180 can be generated for a role 151, 161 in a user model 150, 160. The knowledge of which tasks 153, 163 from a user model 150, 160 map to which SDK components 121-123, 131-134 requires manual input for each existing application product. SDK components 121-123, 131-134 have dependencies such as plugins, so the mapping component 180 may be partially automated to accommodate required dependencies.

Once the mapping has been created, the generation of an application by the building module 190 can be automated as for every task 153, 163 there is a mapping to an SDK component 121-123, 131-134 and for any user that has a role 151, 161 that has a goal 152, 162 that requires that task 153, 163, the correct SDK components 121-123, 131-134 can be pulled out automatically and an application tailored to the role generated.

Figure 1B:
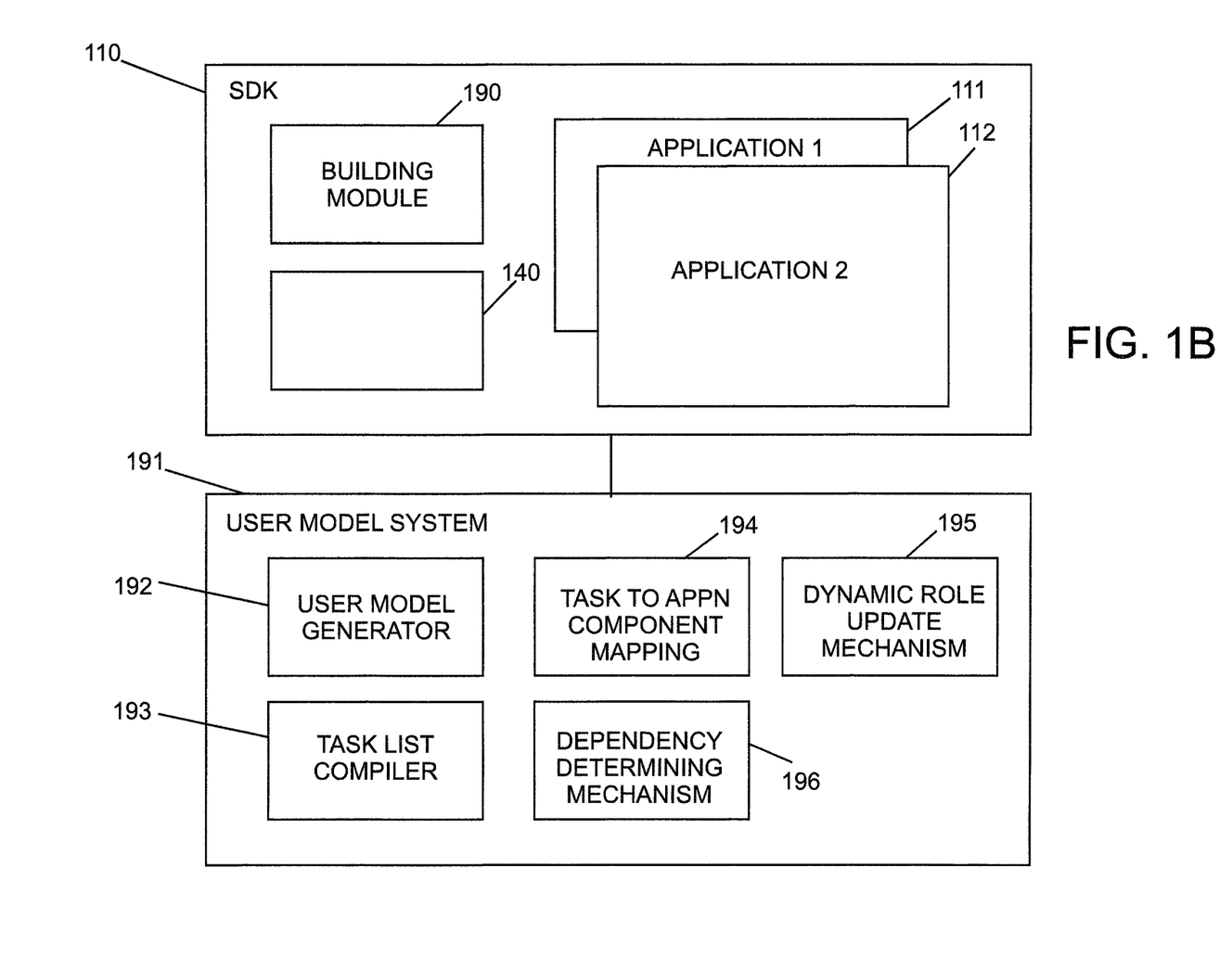

FIG. 1B shows the SDK of FIG. 1A with the building module 190 for building a new application, an SDK shell 140 in which the new application is built, and existing applications 111, 112 from which components are selected for the new application.

FIG. 1B also shows a user model system 191 used by the building module 190. The user model system 191 includes a user model generator 192 for generating a cross-product user model for a user role for which a new application is to be built. The user model system 191 also includes a task list compiler 193, a task to application component mapping 194, and a dependency determining mechanism 196 for determining dependencies of the component of the existing applications. The user model system 191 may also include a dynamic role update mechanism 195 for dynamically updating a user model and the resultant application in response to a change in the user role.

Figure 2A:
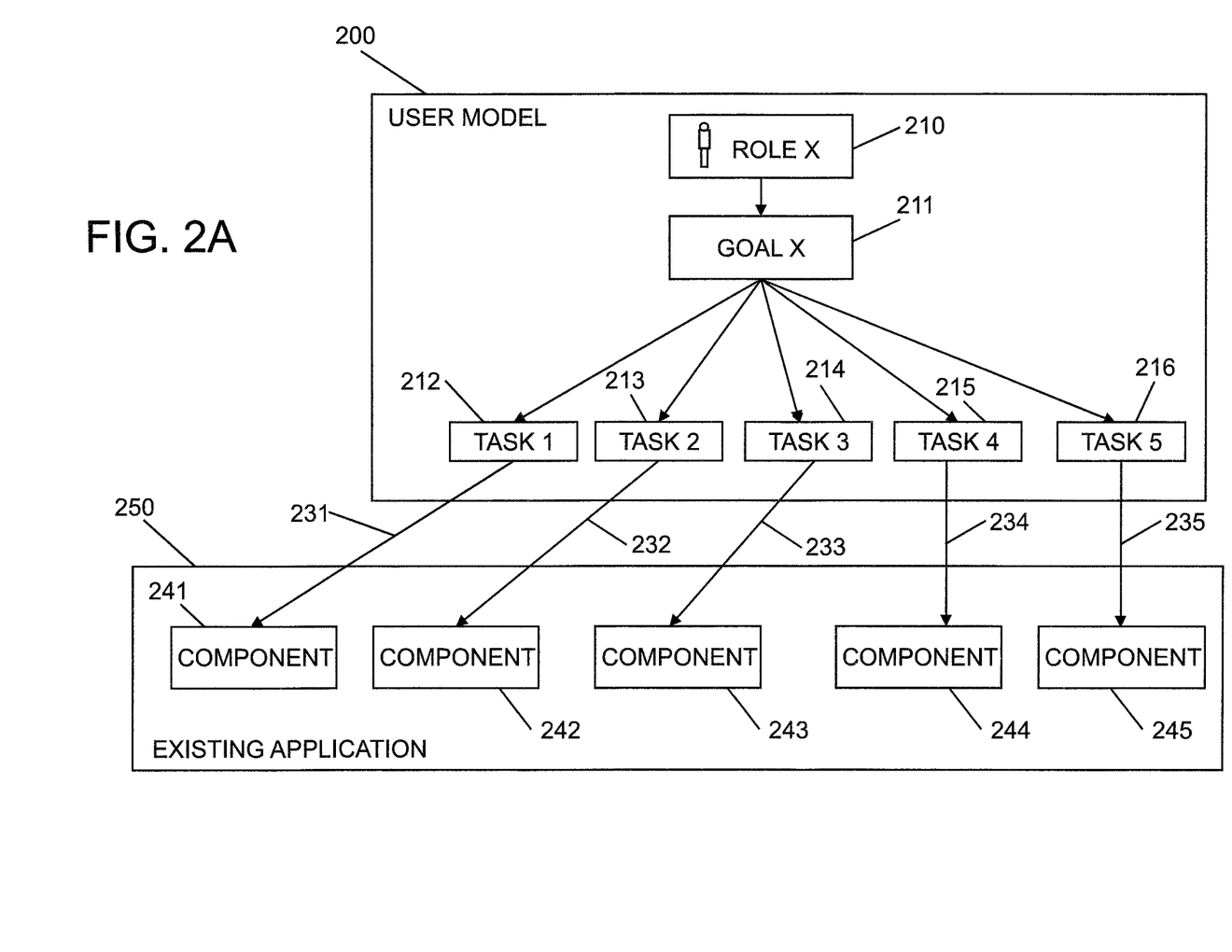
FIGS. 2A and 2B are schematic diagrams of user models in accordance with one embodiment of the present invention.

Referring to FIG. 2A, a schematic diagram shows a user model 200 with mapping to SDK components 241-245 in an existing application 250. The user model 200 defines a user role 210 serving a primary goal 211. A role 210 has, potentially, one to many goals 211, although in this example, only one goal 211 is shown. One or more tasks 212-216 are linked to a goal 211 and therefore to a role 210. Each task 212-216 is mapped 231-235 to a SDK component 241-245 of an existing application.

Figure 2B:
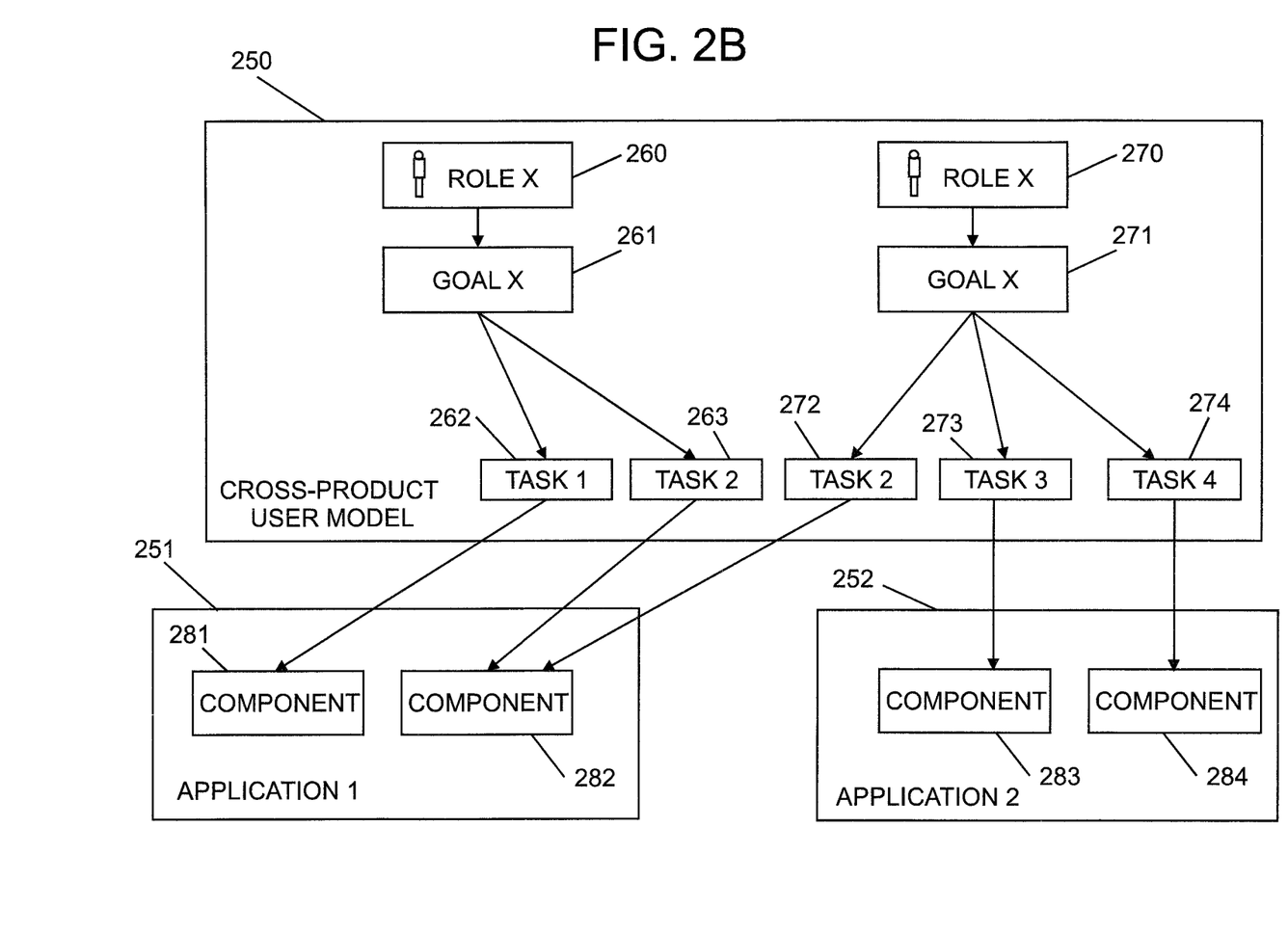

Referring to FIG. 2B, a schematic diagram shows a cross-product user model 250 in which there are two roles X 260 and Y 270 which must be fulfilled in an application to be built. The roles X 260, Y 270 each have goals X 261, Y 271. Goal X 261 has tasks 262, 263 which are mapped to components 281, 282 of a first existing application 251. Goal Y 271 has tasks 272, 273, 274 which map to a component 282 in the first existing application 251 and components 283, 283 in a second existing application 252. One of the tasks "task 2" 263 of the goal X 261 may be the same as one of the tasks "task 2" 272 of the goal Y 271 and therefore they may map to the same component 282 of the first existing application 251. This avoids duplication of components used in the resulting application generated for the cross-product user model 250.

Figure 3:
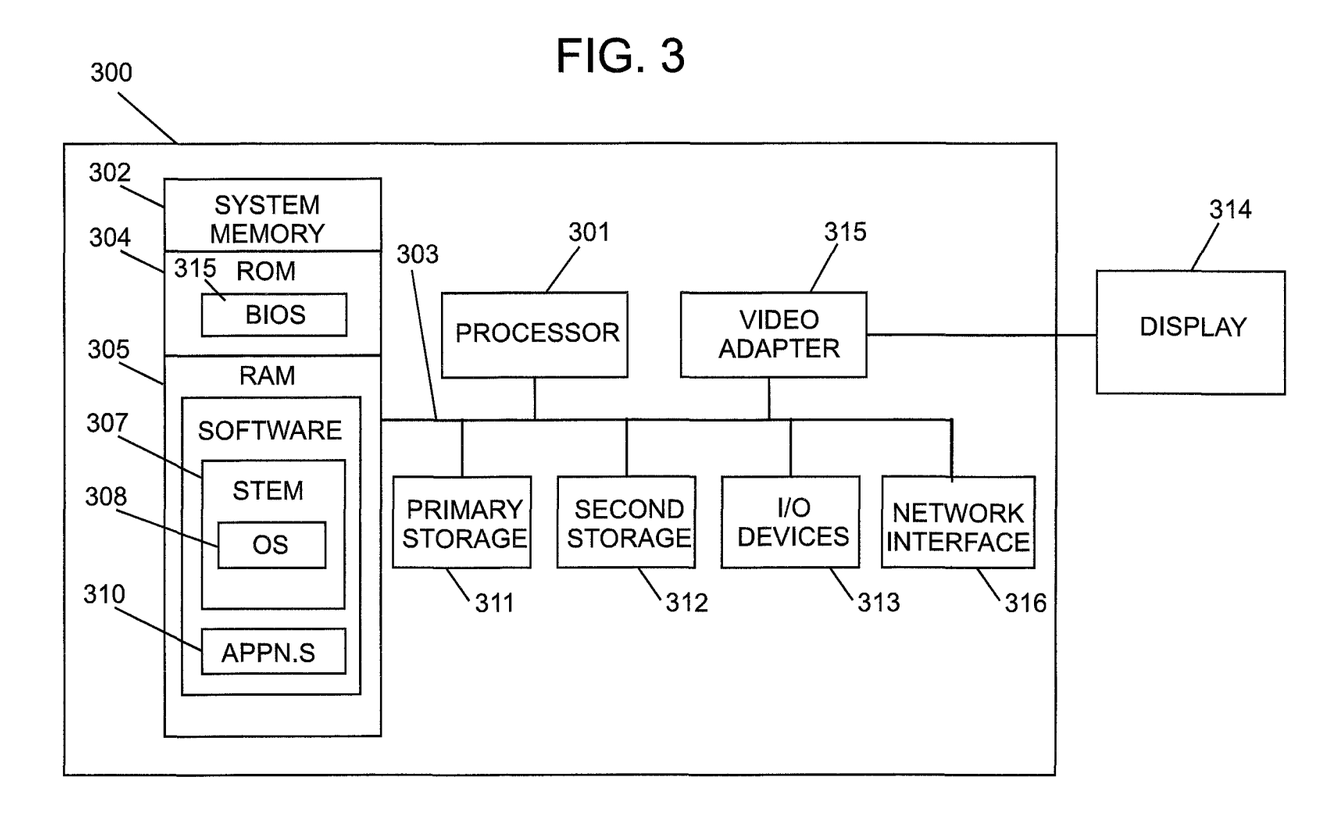
FIG. 3 is a block diagram of a computer system in which one embodiment of the present invention may be implemented.

Referring to FIG. 3, an exemplary system for implementing the described system includes a data processing system 300 suitable for storing and/or executing program code. The data processing system comprises at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
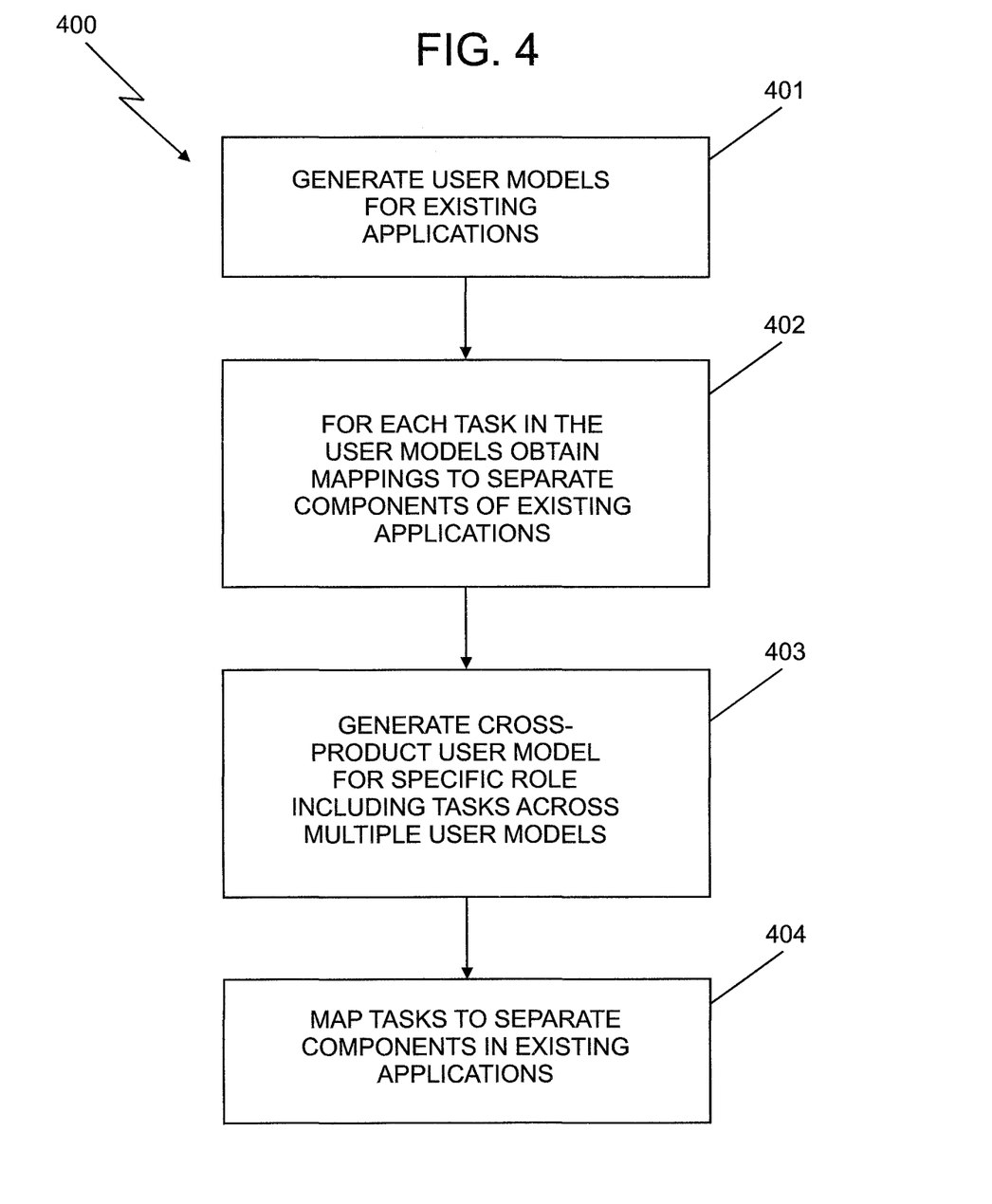
FIG. 4 is a flow diagram of a method of generating an application in accordance with one embodiment of the present invention.

FIG. 4 shows a flow diagram 400 of a method of generating a cross-product user model for a specific role or set of roles. As pre-processing steps, user models have been manually developed (step 401) for each existing application with mappings obtained (step 402) of tasks in the user models to separable components in the existing applications.

A cross-product user model is manually generated (step 403) for specific role or set of roles which a new application is to fulfil, including tasks across the multiple user models developed in step 401 for individual existing applications. The tasks of the cross-product user model are then mapped (step 404) to the separable components in the existing applications. A cross-product user model may be generated for a specific role which takes a sub-set of tasks from a single user model for an existing application.

Figure 5:
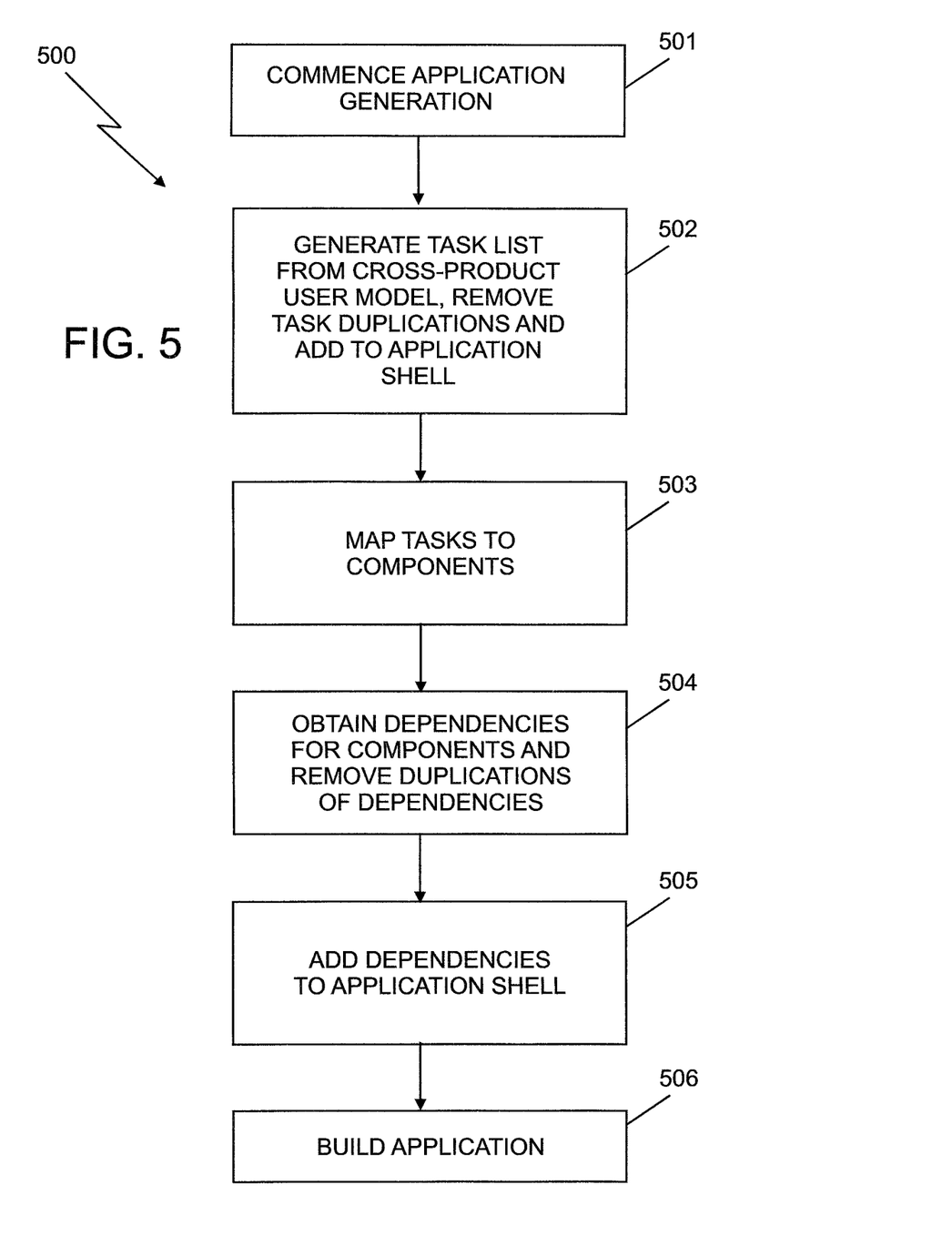
FIG. 5 is a flow diagram of a method of dynamically changing roles in accordance with one embodiment of the present invention.

Referring to FIG. 5, a flow diagram 500 shows a method of automatically generating a new application for a user role. The new application generation commences (step 501) by providing an application shell or base layer and providing the previously generated cross-product user model for the role or set of roles of the application to be generated.

A task list is generated (step 502) from the cross-product user model, any duplications in the task list are removed, and the task list is added to the application shell. The tasks are mapped (step 503) to the separable components in the existing applications. The dependencies of the components are obtained (step 504) and any duplications across the components are removed. The dependencies are added (step 505) to the application shell and the new application is built (step 506).

Users may dynamically change their roles and an application can be updated accordingly. For example, SDKs such as Eclipse include an update facility for downloading new plugins which may be adapted to this use. The method could be built into the application so that the user can change their role and goals, and the system would use the update facility to modify the application. For later Eclipse versions, not even a restart of the application would be necessary as it supports hot code replacement.

Referring to FIGS. 6A to 6E, an example is given of a customer developing a Web services scenario using an Eclipse-based RCP. The customer needs to use more than one Eclipse-based RCP, namely: the WebSphere Application Server Toolkit, to develop a WebSphere Application Server (WAS) Web service and the WebSphere Message Broker Toolkit to develop a WebSphere Message Broker (WMB) Web service (WebSphere is a trade mark of International Business Machines Corporation).

A user model is developed for each application or RCP being used. For example, a user model for WMB would include the role of Web services developer/tester; this role would also be in the WAS model. Both of these roles would have a goal to develop Web services' scenarios. These goals would map to tasks specific to the particular software product, however, some would be the same.

FIG. 6A shows a user model 600 for a WebSphere Message Broker (WMB) Toolkit. The WMB user model 600 has a root 601 with the roles 602-604 of the WMB users defined. One of the roles 602 is of a Web services developer/tester. This role 602 has goals 605, 606 including the goal 606 of developing a WMB Web service. This goal 606 has the tasks 607-609 of developing a WSDL 607, developing a message flow 608, and deploying a message flow 609.

A similar user model is provided for the WebSphere Application Server (WAS) Toolkit including defined WAS roles which also includes a role of Web services developer/tester but with the goal of developing a WAS Web service.

Figures 6, 6E:
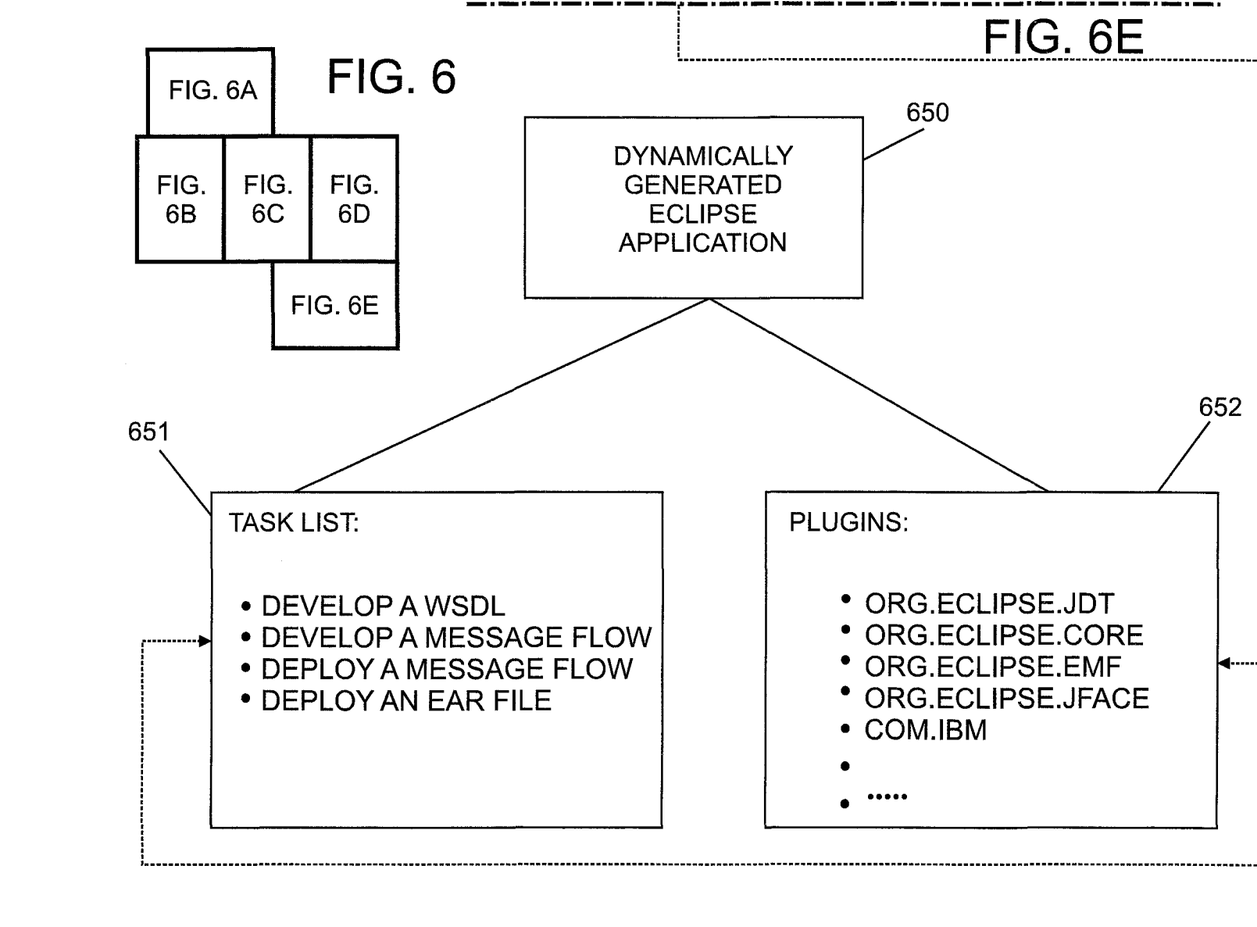
FIG. 6 is an overall arrangement of schematic diagrams of FIGS. 6A to 6E in accordance with one embodiment of the present invention.
FIGS. 6A to 6E are schematic diagrams of an embodiment of the method in accordance with the present invention.
Figure 6A:
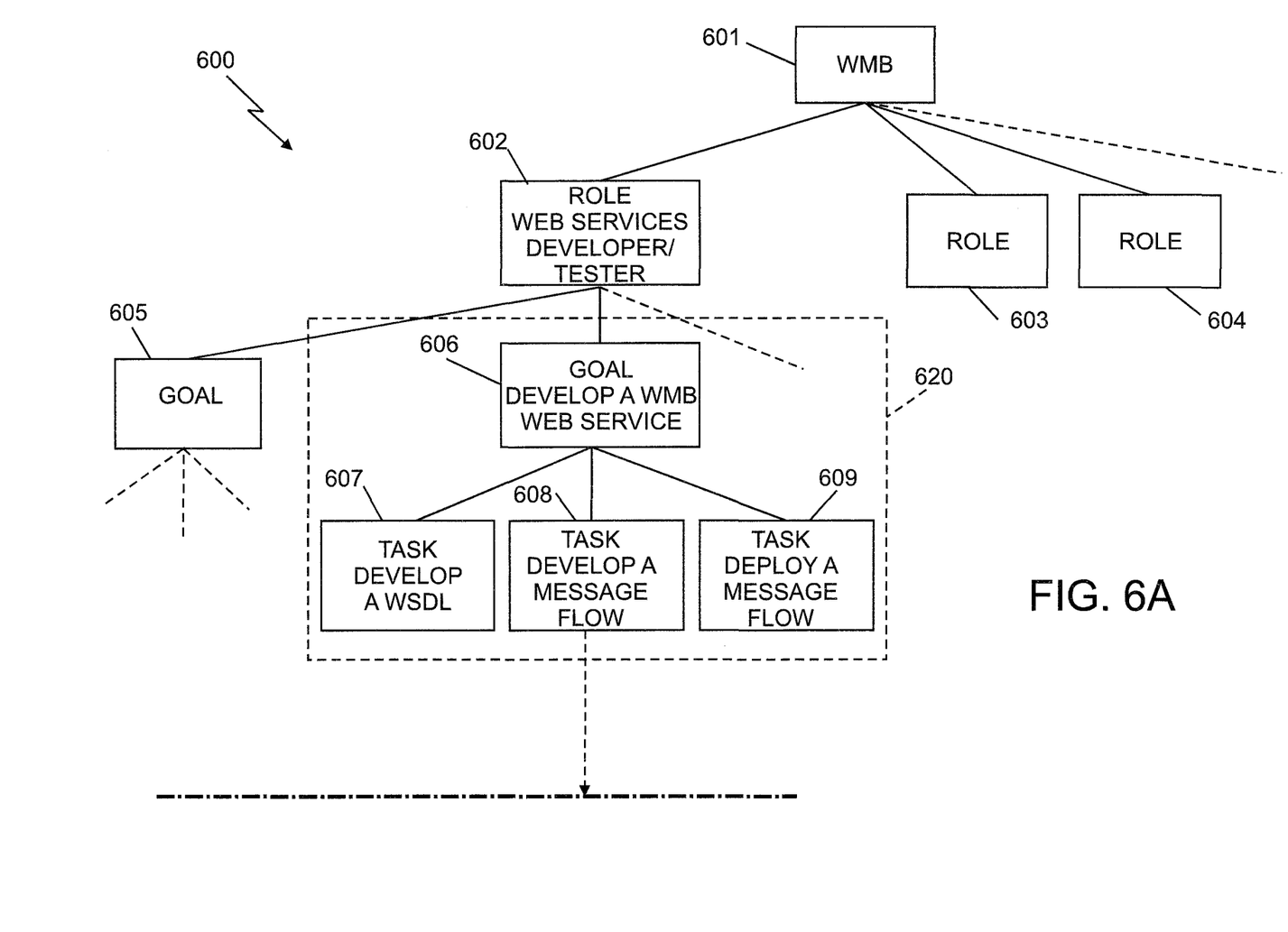
Figure 6B:
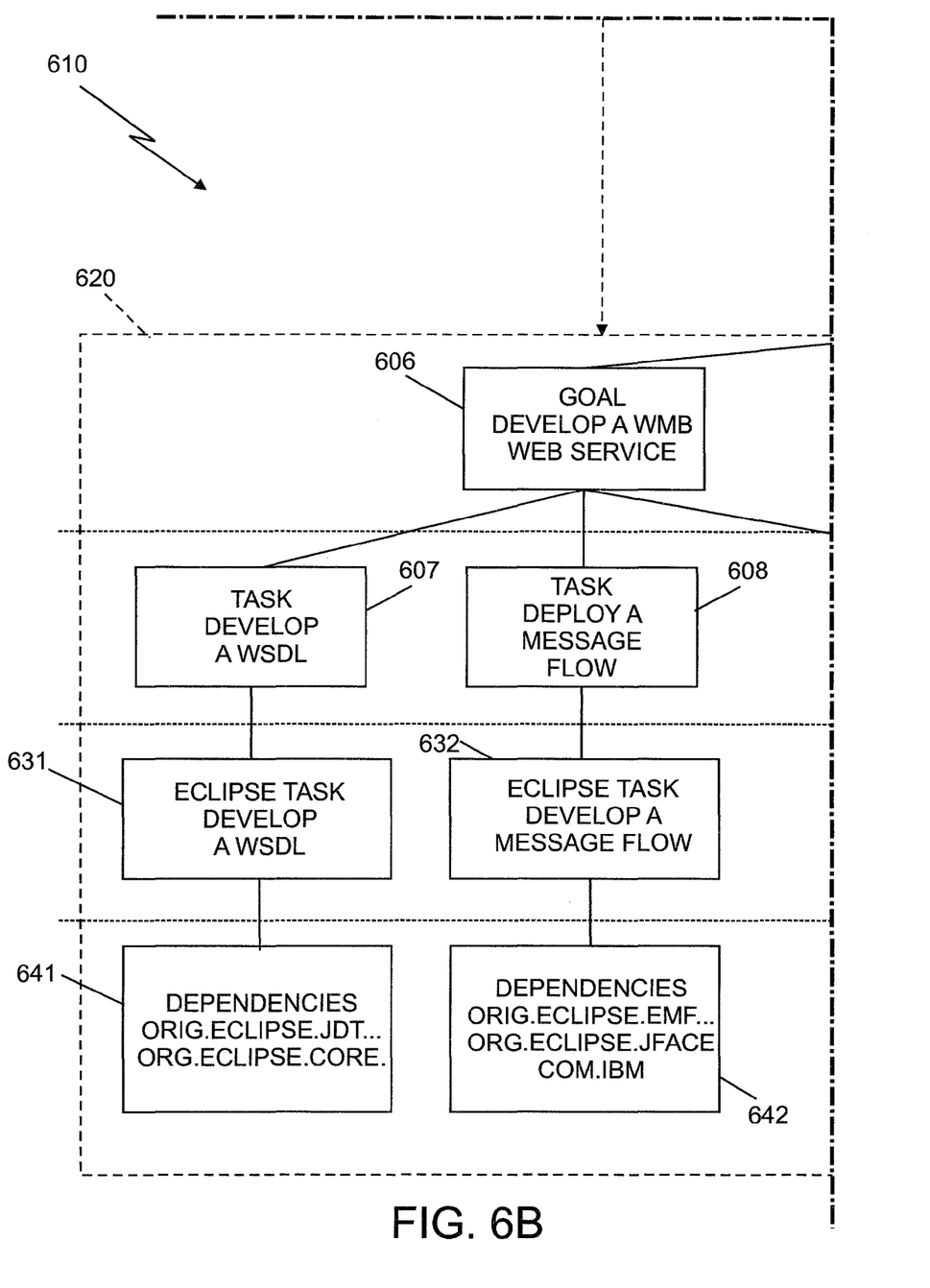
Figure 6C:
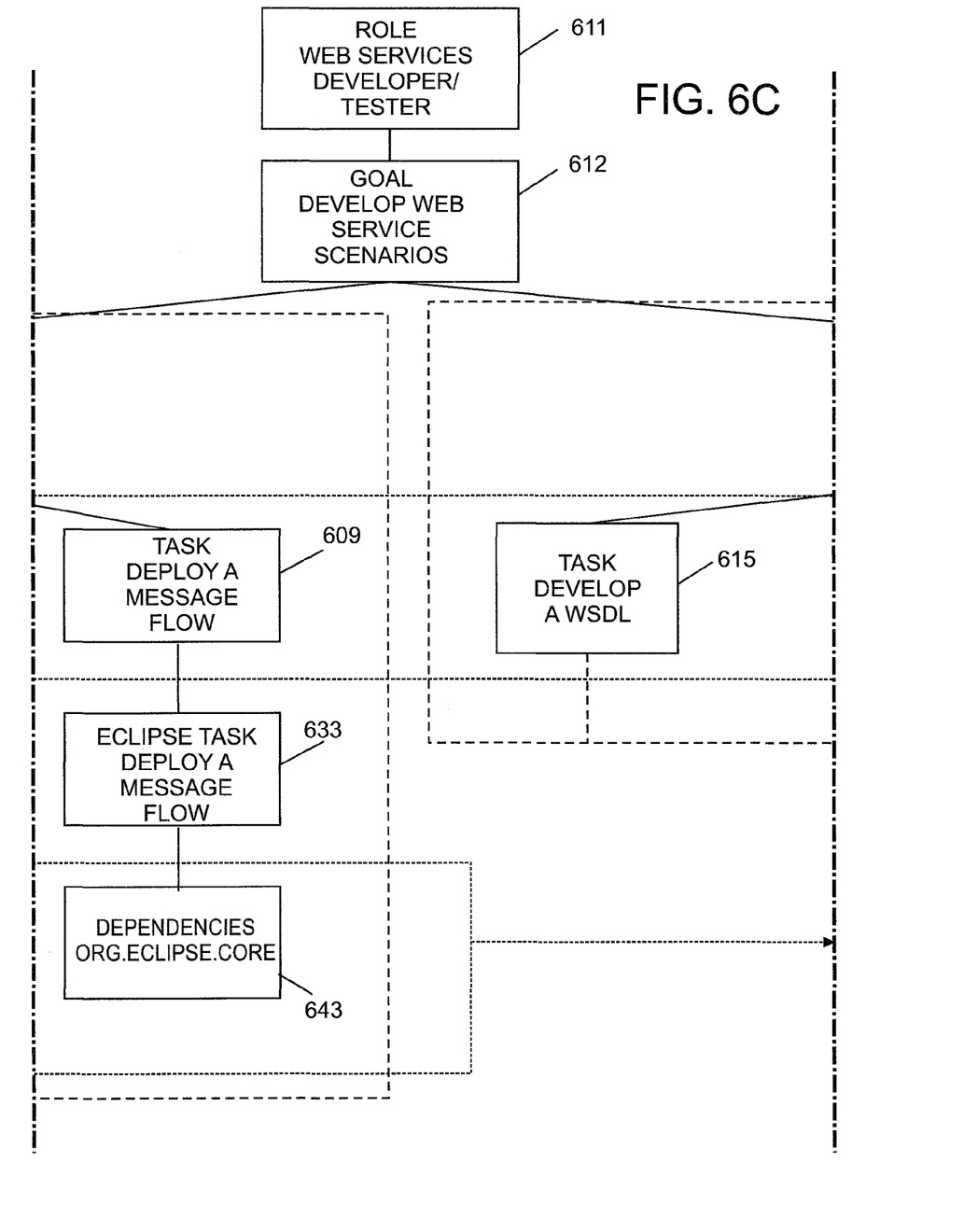
Figure 6D:
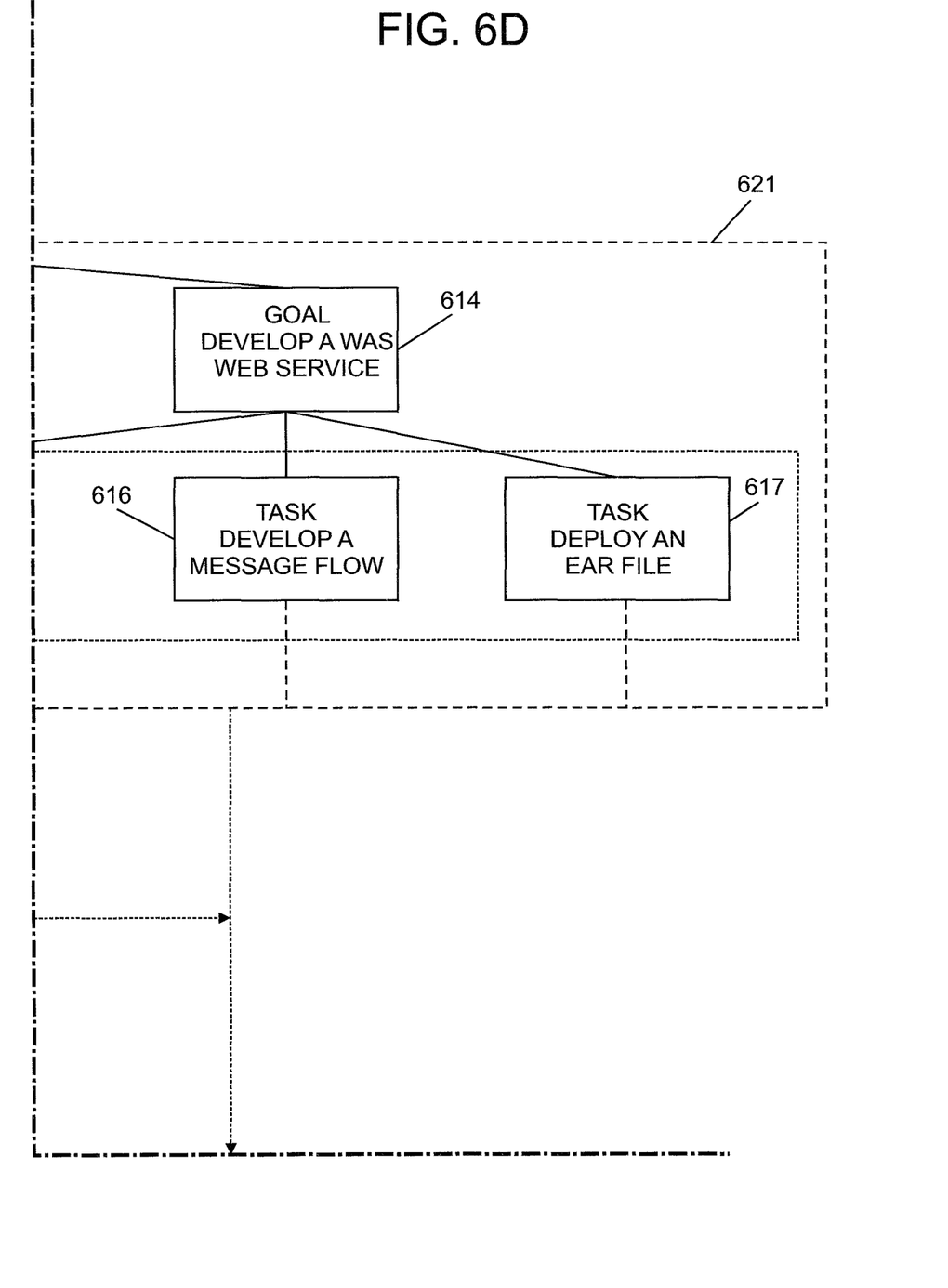

FIGS. 6B-6D shows a cross-product user model 610 for the role 611 of a Web services developer/tester which has the goal 612 of developing Web service scenarios. The goal 612 of developing Web service scenarios includes two goals 606, 614, one from the WMB user model of developing a WMB Web service 606 and one from the WAS user model of developing a WAS Web service 614.

The branch 620 stemming from the goal 606 of developing a WMB Web service is imported into the cross-product user model 610 from the WMB user model 600. Similarly, the branch 621 stemming from the goal 614 of developing a WAS Web service is imported into the cross-product user model 610 from the WAS user model.

The imported branches 620, 621 include tasks for the goals 606, 614. The goal 606 of developing a WMB Web service includes the tasks:
 developing a WSDL 607,
 developing a message flow 608, and
 deploying a message flow 609.
The goal 614 of developing a WAS Web service includes the tasks:
 developing a WSDL 615,
 implementing a Web service 616, and
 deploying an EAR file 617.

Each task 607-609, 615-617 is mapped to the relevant Eclipse-based task 631-633 (not shown for the WAS tasks 615-617). Each Eclipse-based task 631-633 has dependencies 641-643 in the form of plugins.

For example, the Eclipse task 631 of developing a WSDL has the dependencies 641:
 org.eclipse.jdt . . .
 org.eclipse.core . . .
 . . . .
The Eclipse task 632 of developing a message flow has the dependencies 642:
 org.eclipse.emf . . .
 org.eclipse.jface . . .
 com.ibm . . .
 . . . .
The Eclipse task 633 of deploying the message flow has the dependencies 643:
 org.eclipse.core . . .
 . . . .

FIG. 6E shows a dynamically generated Eclipse-based RCP application 650 into which is imported the combined tasks 607-609, 615-617 of the cross-product model 610 shown in FIGS. 6B-6D. Combining these tasks 607-609, 615-617 would result in a duplication of the task of developing a WSDL 607, 615. Therefore, the tasks 607-609, 616, 617 are combined with duplications removed and the resulting task list 651 is input into the generated RCP 650.

The dependencies 641-643 of the combined tasks 607-609, 616, 617 are input into the generated RCP 650, as plugin list 652—again, with any duplications of plugins removed.

As the goals 606, 614 of developing a WMB Web service and developing a WAS service contain an identical task—developing a WSDL, this means that previously customers would have had to use two RCPs to achieve their goals and would have been forced to perform the same task in two different RCPs. Using the described system, a single RCP can be built with all the necessary components to achieve the user's goals.

An Eclipse-based RCP is made up of a set of plugins. So the above will be achieved by mapping tasks to Eclipse plugins as shown below. Eclipse also offers a way to work out what dependencies each plugin has, so only the base plugins for a task will need to be known and the dependencies can be worked out at run time. Once the necessary plugins have been identified, a new Eclipse-based RCP can be built automatically.

Note that only a subset of the WMB model has been drawn, the relevant part for the example. Below the WMB user model is the cross-product model produced from combining the relevant parts from the WMB user model and the WAS user model. At this stage all of the unique tasks are resolved to plugins (so developing a WSDL appears twice but only one set of plugins will be added to the new Eclipse RCP), and these plugins are used to build the new single RCP tailored to the user's requirements.

In another embodiment, an existing application may be the JEE (Java Platform, Enterprise Edition) application server and a new application server is built based on a user's role taking a sub-set of the JEE application server's components that are required for the tasks of the user's role.

The described method and system provide a mechanism for combining components of one or more existing applications to provide the user with a single application for achieving a particular goal or set of goals. A UML model may be used to describe a user and their use of software in order to achieve goals. The tasks specified in the model then need to be mapped to software components. In this way it is possible to extract the correct components from multiple existing applications and build a single application customized to a goal or to a set of goals.

The described method can be used to re-build existing applications into a new installable using mapping of tasks of a user model to SDK specific plugins or bundles.

An application building component alone or as part of a SDK may be provided as a service to a customer over a network.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

The invention can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, or transport the program for use by or in connection with the instruction execution system, apparatus or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for building an application comprising:
generating a user model relating to a new application to be built, the user model comprising at least one defined role of a user with one or more associated tasks to be performed by the user to fulfill the at least one defined role;
compiling a task list for the tasks associated with the at least one defined role in the user model, including removing any duplications of tasks;
accessing a task to application component mapping stored on memory, wherein application components to which the tasks associated with the at least one defined role are mapped are spread over one or more existing applications;
retrieving the application components mapped to by the tasks associated with the at least one defined role;
compiling the retrieved components in the new application;
dynamically changing the at least one defined role in the user model; and
updating the new application by updating the application components to which the tasks associated with the at least one defined role are mapped.

2. The method of claim 1, wherein the application components of the one or more existing applications are specific to a software development kit.

3. The method of claim 2, wherein the one or more existing applications are rich client platforms for the software development kit and the application components are plugins.

4. The method of claim 1, wherein generating the user model comprises generating a cross-product user model including tasks from one or more user models of existing applications.

5. The method of claim 1, wherein the application components have dependencies and the method includes dynamically determining the dependencies during building of the application.

6. The method of claim 1, wherein the at least one role of the user model includes a goal or a set of goals linked to at least one of the one or more associated tasks, and the new application is built to achieve the goal or set of goals to fulfill the at least one defined role.

7. The method as claimed in claim 6, wherein the user model includes a cross-product goal with two or more product specific sub-goals, each of said sub-goals having one or more associated tasks.

8. The method of claim 1, wherein the user model is a unified modeling language model.

9. The method of claim 1, wherein application components to which the tasks associated with the at least one defined role are mapped are spread over two or more existing applications.

10. The method of claim 1, further comprising dynamically updating the user model and the new application in response to a change in the at least one defined role of the user.

11. A computer program product building an application, comprising a non-transitory computer readable storage medium having encoded thereon:
computer readable program code for generating a user model relating to a new application to be built, the user model comprising at least one defined role of a user with one or more associated tasks to be performed by the user to fulfill the at least one defined role;
computer readable program code for compiling a task list for the tasks associated with the at least one defined role in the user model, including removing any duplications of tasks;
computer readable program code for accessing a task to application component mapping, wherein application components to which the tasks associated with the at least one defined role are mapped are spread over one or more existing applications;
computer readable program code for retrieving the application components mapped to by the tasks associated with the at least one defined role;
computer readable program code for compiling the retrieved components in the new application;
computer readable program code for dynamically changing the at least one defined role in the user model; and computer readable program code for updating the new application by updating the application components to which the tasks associated with the at least one defined role are mapped.

12. A method of providing a service to a customer over a network, the service comprising:
- generating a user model relating to a new application to be built, the user model comprising at least one defined role of a user with one or more associated tasks to be performed by the user to fulfill the at least one defined role;
- compiling a task list for the tasks associated with the at least one defined role in the user model, including removing any duplications of tasks;
- accessing a task to application component mapping stored on memory, wherein application components to which the tasks associated with the at least one defined role are mapped are spread over one or more existing applications;
- retrieving the application components mapped to by the associated with the at least one defined role;
- compiling the retrieved components in the new application;
- dynamically changing the at least one defined role in the user model; and
- updating the new application by updating the application components to which the tasks associated with the at least one defined role are mapped.

13. A system for building an application comprising:
- a processor;
- a memory operably connected to said processor;
- a user model generator stored on said memory and executable by said processor to generate a user model relating to a new application to be built, the user model including at least one defined role of a user with one or more associated tasks to be performed by the user to fulfill the at least one defined role;
- a task list compiler stored on said memory and executable by said processor to compile a list of the tasks associated with the at least one defined role in the user model, including removing any duplications of tasks;
- a task to application component mapping stored on said memory and executable by said processor to map application components to the tasks associated with the at least one defined role, wherein the application components are spread over one or more existing applications;
- an application shell stored on said memory to which the application components mapped to by the tasks associated with the at least one defined role are added; and
- a mechanism stored on said memory and executable by said processor to dynamically change the at least one defined role in the user model and update the new application by updating the application components to which the tasks associated with the at least one defined role are mapped.

14. The system of claim 13, wherein the application components of the one or more existing applications are specific to a software development kit.

15. The system of claim 14, wherein the one or more existing applications are rich client platforms for the software development kit and the application components are plugins.

16. The system of claim 13, wherein the user model generator includes generating a cross-product user model including tasks from one or more user models of existing applications.

17. The system of claim 13, wherein the application components have dependencies and the system includes a mechanism for dynamically determining the dependencies during building of the application.

18. The system of claim 13, wherein the user model is a unified modelling language model.

* * * * *